United States Patent [19]
Kotler et al.

[11] 3,746,441
[45] July 17, 1973

[54] MOTION PICTURE PROJECTOR

[75] Inventors: Max Kotler, Montvale, N.J.; Charles Zuckman, White Plains, N.Y.

[73] Assignee: DeJur-Amsco Corporation, Long Island City, N.Y.

[22] Filed: Jan. 21, 1972

[21] Appl. No.: 219,744

[52] U.S. Cl.................... 352/169, 352/137, 226/62, 226/122
[51] Int. Cl. ............................................ G03b 21/38
[58] Field of Search........................... 352/137, 169; 226/62, 122, 160, 161

[56] References Cited
UNITED STATES PATENTS

| | | | |
|---|---|---|---|
| 3,524,573 | 8/1970 | Kotler | 226/122 X |
| 3,603,678 | 9/1971 | Anderl | 352/177 X |
| 3,520,596 | 7/1970 | O'Donnell | 352/169 X |
| 3,591,265 | 7/1971 | Shropshire | 352/169 X |
| 3,637,125 | 1/1972 | Freudenschuss | 226/62 |
| 3,671,113 | 6/1972 | Johnson | 226/62 X |

Primary Examiner—Samuel S. Matthews
Assistant Examiner—Monroe H. Hayes
Attorney—Maxwell James et al.

[57] ABSTRACT

A motion picture projector having a fixed relation of the film transport operating mechanism to the shutter operating means and operating at a normal mode or rate of operation such as to produce continuous motion pictures, control apparatus is provided to alter or change the mode or rate of operation from a normal continuous projection speed to a "sequence" of motion picture projection, i.e., a slow series of automatically changing still projections, and to produce by stepless, i.e., continuous, increments a change in the intervals of the still projections in any such automatically changing series of still projections. Such changes in the mode or rate of operation is effected without altering the fixed relation between the film transport operating mechanism and the shutter operating mechanism.

10 Claims, 8 Drawing Figures

MOTION PICTURE PROJECTOR

This invention relates to a motion picture projector and more particularly to a motion picture projector embodying controls for altering or changing the mode, i.e., the rate of projection of the motion pictures from a normal or continuous projection to (a) a "sequence" of picture projection, i.e., a slow series of automatically changing still projections and (b) for changing by stepless or continuous increments the intervals of the still projections in any such automatically changing series of still projections.

In conventional projectors of the motion picture type, provision is often made to stop the projection so as to render a "still" picture. In some projectors provision is made to project the image at slow motion, as by transporting the film one frame every other stroke of the film transport means. In other projectors the rate of projection is slowed by reducing the speed of the motor. In still other projectors slower speeds are obtained by combining slow motion and slowing the drive motor. The slowness of projection speed is limited by the introduction of objectionable flicker.

In a motion picture projector having a fixed relation of the film transport operating means to the shutter operating means and operating at a normal rate such as to produce continuous motion pictures, it is desirable to alter or change the mode of operation such that the rate of projection is slowed down so as to produce the effect of a "sequence" projection or a series of still projections. Sequence projection in this context may be defined as a speed slower than slow motion projection or slow projection speed. If, for example, slow projection is made at the rate of say, six frames per second, then sequence projection is defined as any speed less than six frames per second. It is thus desirable to change the rate of projection to any rate slower than six frames per second in increments so as to produce a series of automatically changing still projections, as well as to vary rate of change, namely the intervals or time spacing of the still projections in stepless, i.e., continuous increments in any such automatically changing series of still projections. It is also desirable to effect these projection rate changes without changing the shutter speed and hence without introducing objectionable flicker. It is also desirable to provide for the production of unchanging "still" projections, namely projection of "stills," for indeterminate periods.

It is the prime object of the present invention to produce a motion picture apparatus embodying controls for effecting the changes in the modes or rates of projection of the motion pictures in the ways above described, and also a control compatible therewith for producing unchanging still projections.

To the accomplishment of the foregoing objects and such other objects as may hereinafter appear, our invention is directed to the motion picture projector as defined in the appended claims taken together with the following specification and the accompanying drawings in which :

Referring now more in detail to the drawings, we shall first describe the structure and operation of the motion picture projector shown in FIGS. 1 to 5 of the drawings. These figures show an embodiment of the salient mechanical parts of the projector disclosed in U. S. Pat. No. 3,524,573 patented Aug. 18, 1970 (of which one of the applicants was a co-inventor) modified for adaption to and the incorporation of the electronic system shown in FIGS. 6 and 7a and 7b of the present disclosure. For identification, the salient parts of the projector as shown in FIGS. 1 to 5 hereof will have applied thereto the same reference characters as applied to the corresponding parts of the projector disclosed in said U.S. Pat. No. 3,524,573.

In this projector, power is obtained from a source through a suitable transmission (not shown) delivered to the main drive shaft 1 by a drive belt 2 connected to a compound pulley 3 affixed to the shaft 1. Shaft 1 rotates in a bearing 4 which is mounted in the main support structure 5 of the projector. A shutter blade 6 is affixed directly to the compound pulley 3.

The projector is characterized by the provision of a film transport means which for its film perforation penetration is activated by a spring biased means, employed in conjunction with a cam operated means operable at a predetermined normal cyclic speed and which cam operated means is active on the transport means in opposition to said spring-biased means for effecting an outward movement of the transport means for film perforation disengagement for each transport cycle. Such film transport means comprises a cam 7 affixed to the main shaft 1, which cam rotates between shoes 8 and 9 acting as cam followers, which shoes form part of a film transport means 10. Said cam is operable in both clockwise and counterclockwise modes. Film transport means 10 is pivotally movable about a retainer 11, which latter comprises a positional bearing serving both as a pivot about which the film transport means 10 oscillates and as a confining element such that slidable in and out motion of the film transport is permitted.

Pin 13 is eccentrically positioned with respect to a control shaft 14, which latter is rotatably mounted in a bearing 15 held in a frame plate 16. A manually operable knob 17 is keyed to the control shaft 14. A spring 18 located around an extension of the pin 13 applies pressure against the retainer 11. A change of angular position of the pin 13 with relation to the shaft 14 and the cam 7 has the effect of shifting the fulcrum about which the film transport means 10 oscillates and translates, thus changing the points of penetration of the film perforations by the claw (hereinafter referred to) of the film transport means for framing the film in the projector. In the accompanying drawings as shown particularly in FIG. 1 thereof, the film transport means is shown in mid-position of its return or "up" stroke movement when cam 7 rotates clockwise in the forward mode. Conversely, the illustration in the drawings may also be viewed with the cam 7 operating in the reverse mode (counter-clockwise) thus illustrating the position of the film transport means in mid-position in the down stroke.

Penetration of film perforation by the film transport means is controlled by a first cam 20 which is affixed to or made integral with cam 7 (the pull-down cam) and thus operates at the aforesaid determined cyclic speed. The film transport means 10 is formed with an arm extension 21 which engages the peripheral surface of the cam 20 serving as the cam follower.

Figure 1:
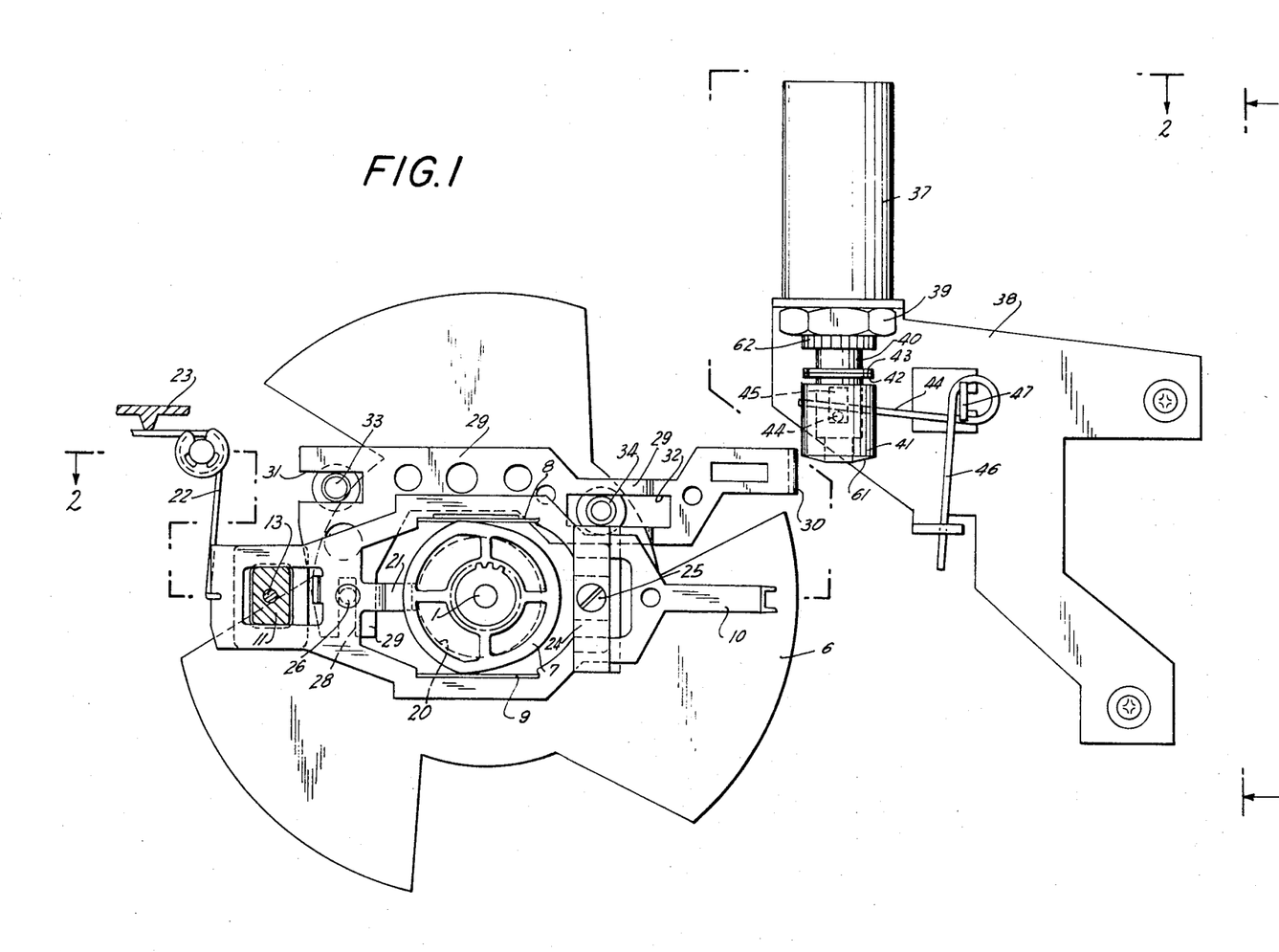
FIG. 1 is a front elevational view of the salient parts of the motion picture machine embodying the present invention.
Figure 2:
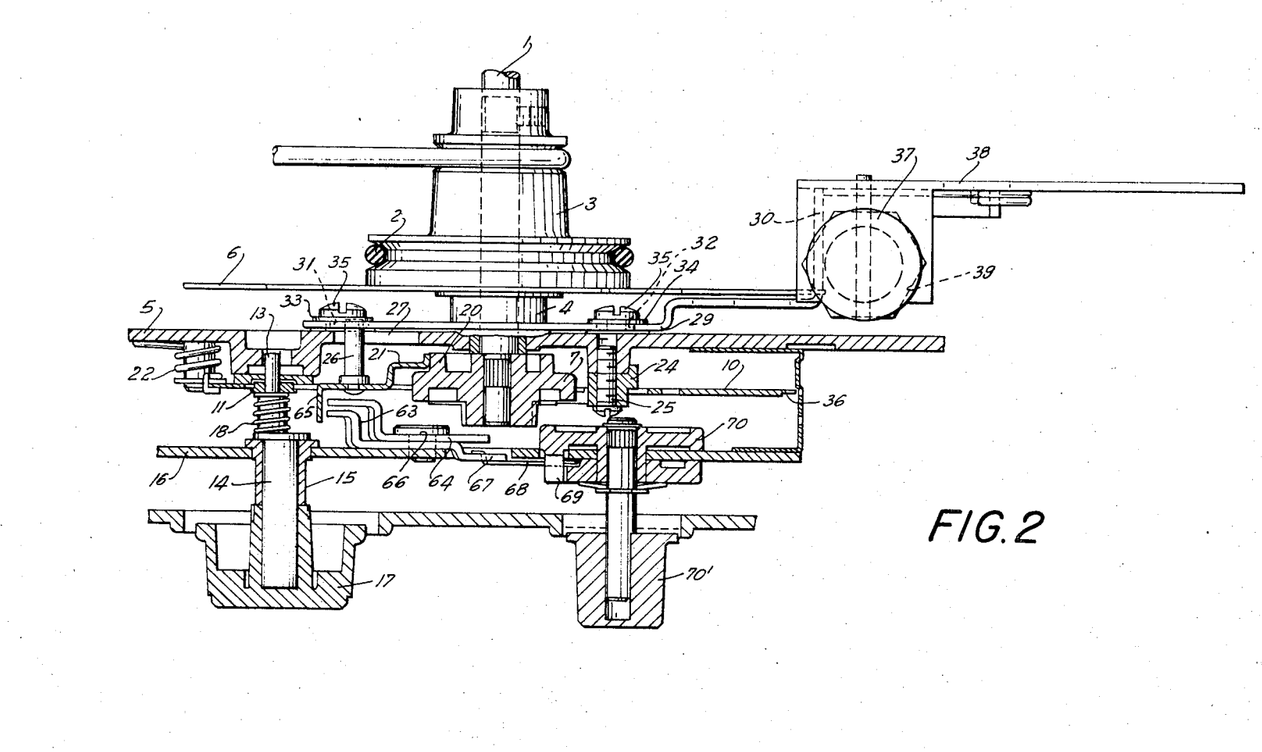
FIG. 2 is a cross-sectional view of the projector parts shown in FIG. 1 taken in cross section in the broken line 2—2 of FIG. 1.

The spring-biased means which is active on the film transport means to effect an inward translatory movement thereof for film perforation comprises a torsion spring 22 active at one end on the end of the film transport means 10, as clearly depicted in FIGS. 1 and 2 of the drawings, exerting pressure thereon in a generally longitudinal direction through the center pin 13 and the main shaft 1. A stop 23 (see FIG. 1) is a fixed element holding the other end of the spring 22 in a generally constant position. The pull-down cam 7 is maintained in a lateral position by means of a guide 24 such that oscillatory and translatory motion of the film transport means is permitted, the said guide being affixed to the main support structure 5 by means of the bolt 25.

By means of this described structure the film transport means 10 is activated by a spring-biased means (the spring 22) which is active on the film transport means 10 to effect an inward translatory movement thereof for film perforation penetration and there is thus provided also a first cam operable at a predetermined cyclic speed with means operable by said first cam at said cyclic speed and active on the transport means in opposition to said spring-biased means for effecting an outward translatory movement of the transport means for film perforation disengagement for each film transport cycle.

For adapting these described parts of the projector for the selective change mode operations referred to, the film transport means 10 is provided with a pin 26 affixed thereto, the pin projecting through a suitable aperture 27 in the main support structure 5. The pin 26 engages in a cooperating slot 28 in a slide member 29, the slide member being provided with a laterally extending arm 30. The slide member is formed with bearing slots 31 and 32 through which bushings 33 and 34 respectively extend, said bushings being retained in place against suitable surfaces of the main support 5 by screws 35, 35. The fit between the slide member 29 and the bushings are such as to permit free, translating motion of the slide member when driven by the film transport means 10. The film transport means is formed at its film penetrating end with the claw 36.

Figure 3:
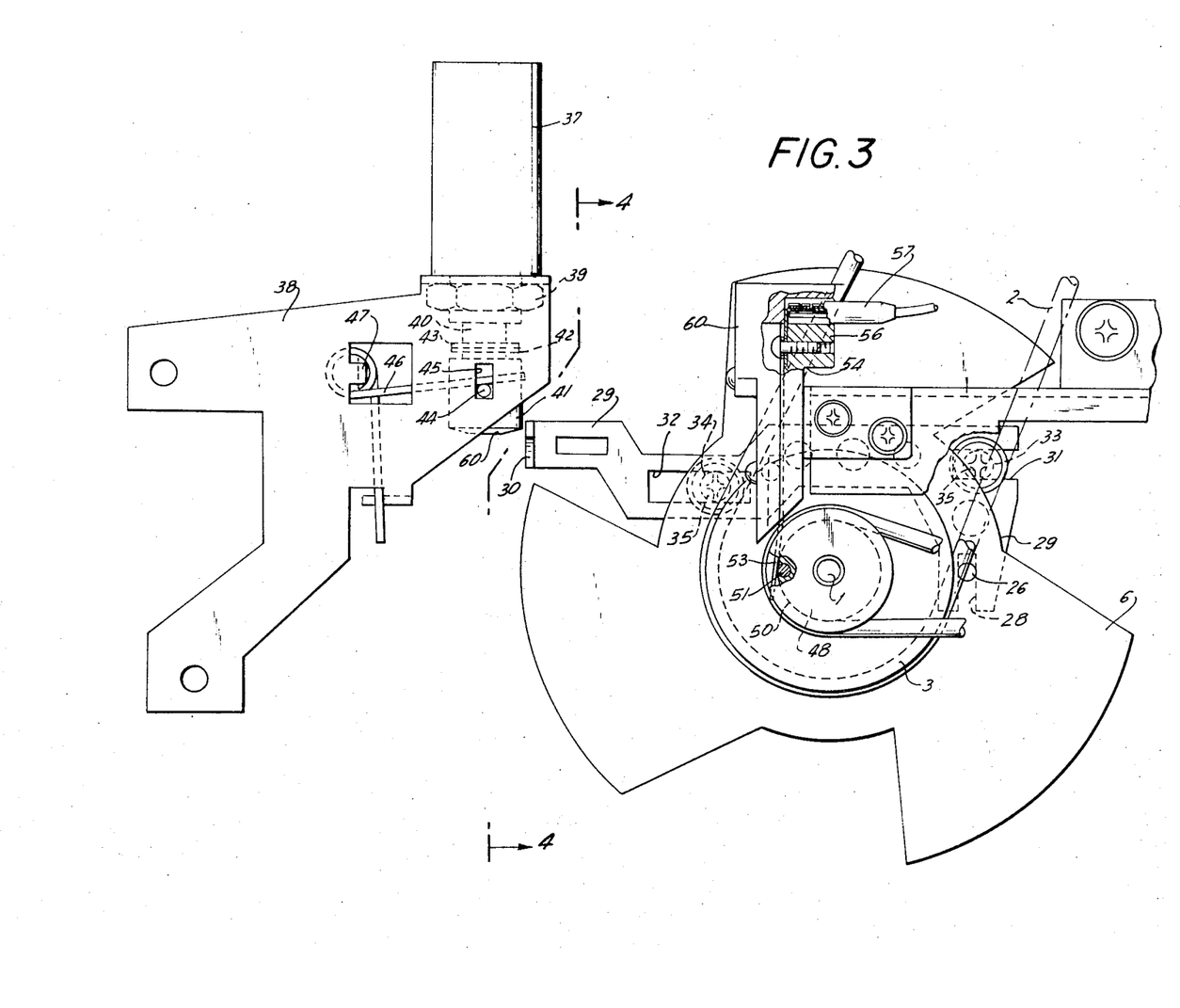
FIG. 3 is a rear elevational view of the parts of the projector shown in FIG. 1.
Figure 4:
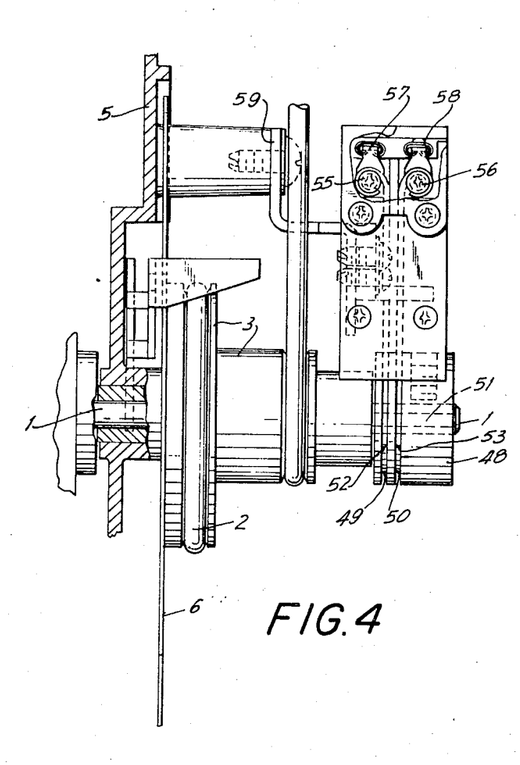
FIG. 4 is a rear elevational view of the parts of the projector of FIG. 1 taken in cross section along the broken lines 4—4 of FIG. 3.
Figure 5:
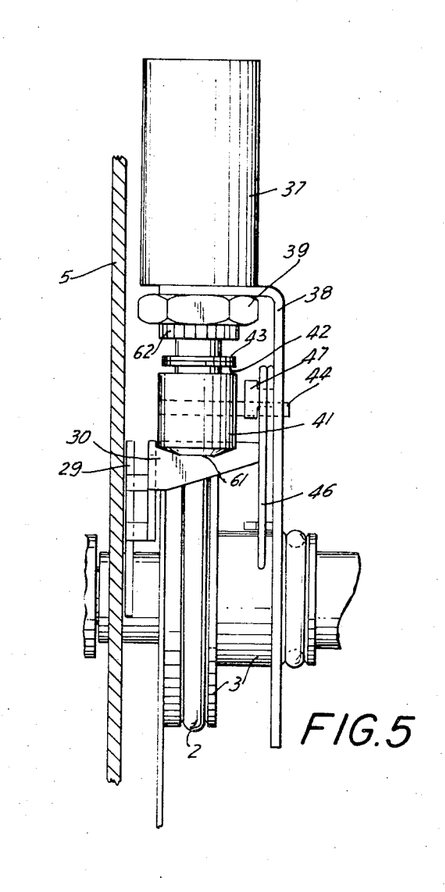
FIG. 5 is a side elevational view of parts of the projector shown in FIG. 1 viewed in the direction of the line 5—5 of FIG. 1.

For cooperation with the slide member 29 there is provided a solenoid 37 secured to a bracket 38 by means of a nut 39. The bracket is in turn attached to the main support of the projector. The solenoid has an armature 40 to which a shoe 41 is secured. A ring 42 is secured to the armature 40 spaced by a non-metallic washer 43. A pin 44 is affixed to the shoe 41, the said pin extending through a slot 45 in the bracket 38 such that the pin 44 is slidable in said slot. With this construction when the solenoid 37 is de-energized, the armature 40, the pin 44, the ring 42 and washer 43 are driven in a downward direction under the action of a spring 46 to a solenoid deenergized position which is a reset position. Downward motion is limited by the position of the lower end of the slot 45. FIGS. 1 and 3 depict this reset position of the parts. In such position the shoe 41 (as will be detailed more hereinafter) is interposed to engage the arm 30 of the slide member 29 to prevent the further movement of said arm and the film transport means attached thereto into a film penetrating position; these positions of the parts are also clearly indicated in FIGS. 1 and 3 of the drawings. The spring 46 is anchored to the bracket 38 by the means 47.

The described projector is further provided with a commutator 48 fixed to the main shaft 1, the said commutator having two annular grooves 49 and 50 (see particularly FIGS. 3 and 4) and an electrically conductive pin 51 extending through said annular grooves. The commutator and its pin are thus in fixed relation to the cams 20 and 7.

Electrically conductive springs 52 and 53 are affixed to a mount 54 at attachments 55 and 56 respectively to which two lead wires 57 and 58 respectively are connected, these lead wires being in turn connected to the electronic system as will be described further hereinbelow. The mount 54 is suitably attached to the main support 5 by the bracket 59. A cap 60 is provided to serve as a protective cover for the conductive springs 52 and 53. The lead wires are in a normally open state during each rotation of the main shaft except when momentary contact is created by the pin 51 contacting the conductive springs 52 and 53.

When the projector is operating, claw 39 is driven so as to produce a film transporting motion. Penetration and depenetration of the film perfortions is controlled by cam 20 acting in conjunction with cam 7 which latter controls the vertical transport of the film. The penetration stroke of claw 39 is controlled, in part, by the arm extension 21 of the film transport means which follows the surface of the cam 20, under the force exerted by tension spring 22. It can thus be seen that lateral film penetration movement of the film transport means 10 and the slide 29 are restricted if and when shoe 41 of the solenoid assembly is in the de-energized, or down, position. When this occurs, extension arm 30 of slide 29 strikes the bottom of shoe 41 thus limiting motion of the claw 39 in the direction of the film. Penetration of the film by the claw is thus prevented and film transport does not occur. When film penetration is prevented as described, the arm 21 of film transport means 10 loses contact with the surface of cam 20 for a portion of the rotation of said cam. When solenoid 37 is energized the motion of claw 39 and slide 29 are unrestricted and normal film transport occurs in either its forward or reverse modes.

When solenoid 37 connected to the electronic circuit system to be described below, receives an electrical pulse of short duration, said solenoid will be energized for a correspondingly short interval of time, sufficient to cause the solenoid armature assembly (40 to 44) to stroke up and down for an interval of less than one period of rotation of the cams 20 and 7, determined by the time of contact of contact springs 52 and 53 with the armature pin 51.

When solenoid 37 is de-energized, the said armature assembly is driven downward to a reset position by the influence of spring 46. Upward motion is limited by washer 43 striking an extension 62 of the solenoid 37. Completion of the reset stroke of the armature assembly occurs when extension arm 30 of slide 29 is retracted from the path of said armature assembly by the depenetration stroke of the surface of the cam 20. Further film transport cannot occur until solenoid 37 is re-energized.

It can be seen therefore, that when the solenoid is energized for relatively long periods of time, the effect will be that of normal motion picture projection. On the other hand, when the solenoid receives an electrical pulse, the effect will be to change the frames being projected to the next adjacent frame. The new frame now being projected will remain until the next succeeding pulse.

"Still" projection for an indeterminate period is obtained by the provision of a manually controlled element which is selectively movable into the transport path of the transport means to intercept the inward translatory movement thereof to inhibit its engagement with the cam 20, thereby preventing or inhibiting film penetration. This element may be held in such intercepting position for any desired period. This operation is secured by manually interposing the left end fingers 63 of a lever 64 into the arm 65 of transport means 10. Its function is similar to that of the extension arm 21 of the transport means 10 so that the claw 36 is thereby prevented from entering the film perforations, and thereby preventing the film from being transported. This "still" mode of operation may take place over an indefinite period of time.

The lever 64 is pivotable about the stud 66 (see FIG. 2). A projecting arm 67 of this lever is an anchor for one end of a spring 68, and a projecting lug 69 on a rotatable member 70 is an anchor for the other end of the spring 68. The spring functions as an "overcenter" detent and maintains the lever 64 in position at either end of its stroke. Motion is manually imparted to the lever by means of a suitable knob 70' attached to the member 70. FIG. 2 illustrates the "still" mechanism in its disengaged position. It will be seen that the operation of this manual control of the transport means is compatible with the operation of the slide member 29 so that the production of "stills" may be obtained independent of the operation of the projector by way of the solenoid 37.

Figure 6:
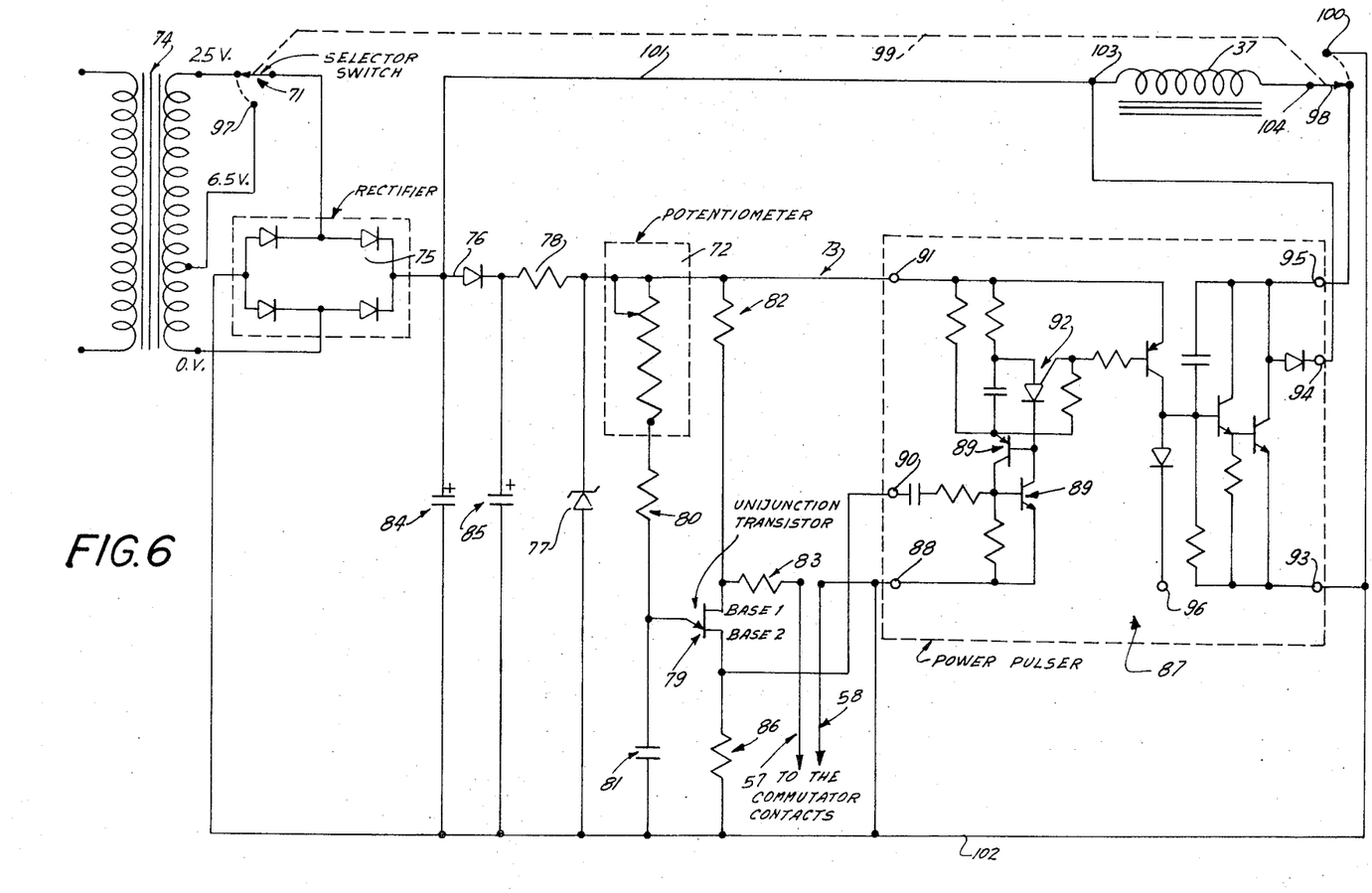
FIG. 6 is a schematic view of the electronic circuit mechanism for selectively changing the mode or rate of picture projection of the present invention.

FIG. 6 of the drawings depicts the circuitry and the electronic circuit system for operating the solenoid 37 to produce the different rates or modes of picture projection embodying the principles of the invention.

In its generic aspects, the circuitry includes a selector switch 71 for changing the operation of the projector between a coninuous (run or normal) picture projection mode to a pulse "sequence" projection mode of the solenoid 37, and a potentiometer 72 forming part of an electronic circuit system 73 operable in stepless, i.e., continuous increments, in conjunction with the commutator switch (referred to also hereinafter as the shutter shaft switch) by way of the input leads 57 and 58, for controlling the pulse mode operation of the solenoid 37 to produce the "sequence" projection, namely, a slow series of automatically changing still projections and for varying by such continuous increments the intervals or time spacing of the still projections in such automatically changing series of still projections.

Referring more in detail to FIG. 6, a transformer 74 has an output changeable between 25 volts and 6.5 volts AC as indicated in the drawing. When mode selector switch 71 is in the 25 volts position (shown in full lines in the figure) the 25 volts RMS output is full wave rectified by rectifier 75 to 35 volts DC, unregulated. In this positioning of the selector switch, the electronic circuit system 73 is in connected operative condition as shown. The rectified 35 volts DC is isolated from a +15 volts power regulated and supplied by means of a diode 76, zener 77 and resistor 78. The 15 volt DC supply is used to provide biasing for the operation of unijunction transistor 79, the time interval of which is determined by the potentiometer 72, resistor 80 and capacitor 81. Resistor 82 provides temperature compensation. Resistor 83 is used to provide the synchronization signal from the commutator on the cam shaft. Capacitor 84 filters the 35 volt DC supply. Capacitor 85 filters the 15 volt DC supply. Resistor 86 limits the current from the discharge of capacitor 81 and also provides a voltage output to trigger a power pulser 87.

The power pulser 87 is a known integrated circuit designed to switch high power loads from a precisely timed interval when triggered by a logic level input. It is capable of driving inductive and resistive loads. PNP transistors 89 coupling the input circuit 90 and the output circuit 95 within the device provides isolation which permits considerable flexibility in output circuit configuration and minimizes noise coupling to the input. The rate of change of output voltage is controlled to minimize RFI. A built-in diode 92 facilitates clamping induction loads when the output pulse is terminated. The emitter, clamp, collector and inhibit terminals are indicated by the reference characters 93, 94, 95 and 96, respectively.

As indicated above, when the mode selector switch 71 is in the 25 volts RMS position, the electronic circuit system 73 is in connected operative condition. When the selector switch 71 is moved to engage contact 97, and in conjunction therewith a switch 98 is moved by the mechanical connection 99 to engage contact 100, the lower 6.5 AC RMS voltage is rectified by rectifier 75 providing approximately 7.5 volt DC which is directly applied by way of conductors 101 and 102 to the terminals 103 and 104 of the solenoid 37 to operate the same for the normal or run mode of the projector; and the electronic circuit system is at the same time disconnected from operative condition.

Figure 7A:
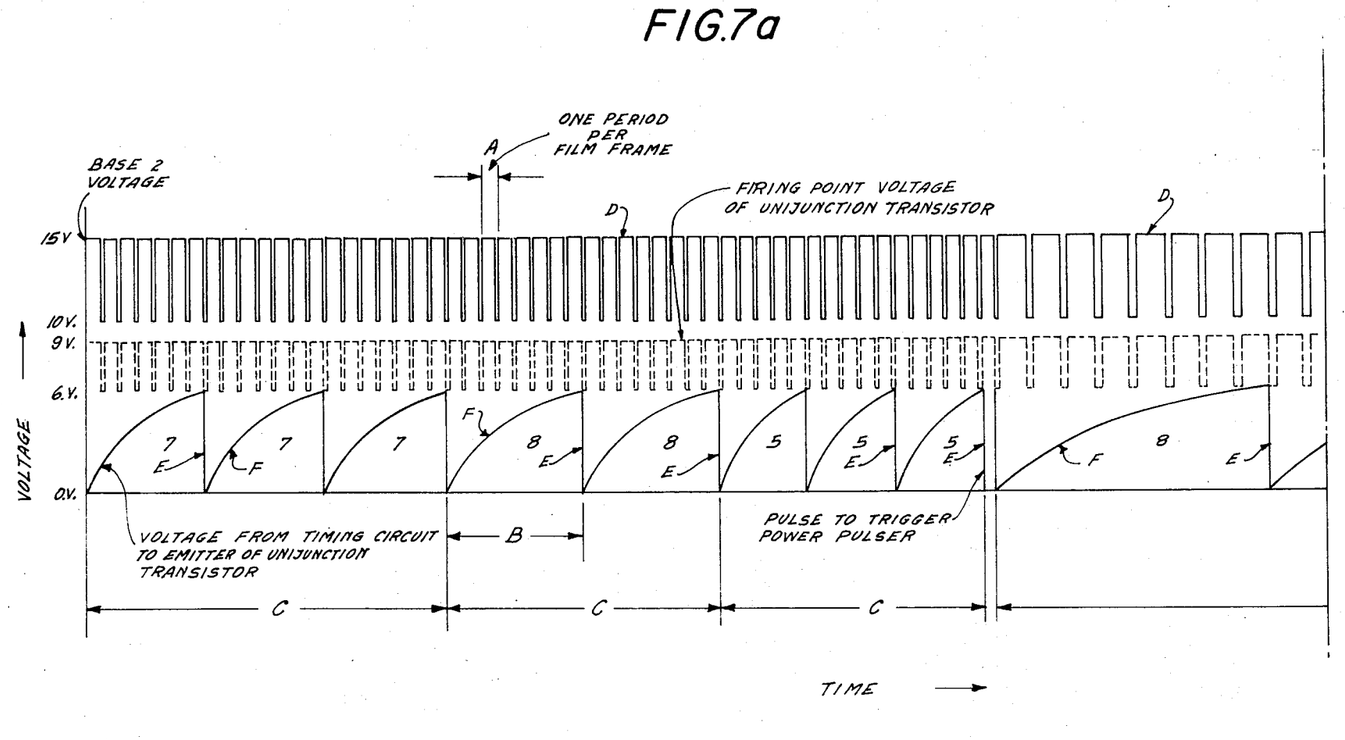
FIGS. 7a and 7b are composite views depicting the graphical representation of the electronic circuit system of FIG. 6 and depicting the effects of the operation of the mechanism for selectively changing the mode or rate of picture projection.
Figure 7B:
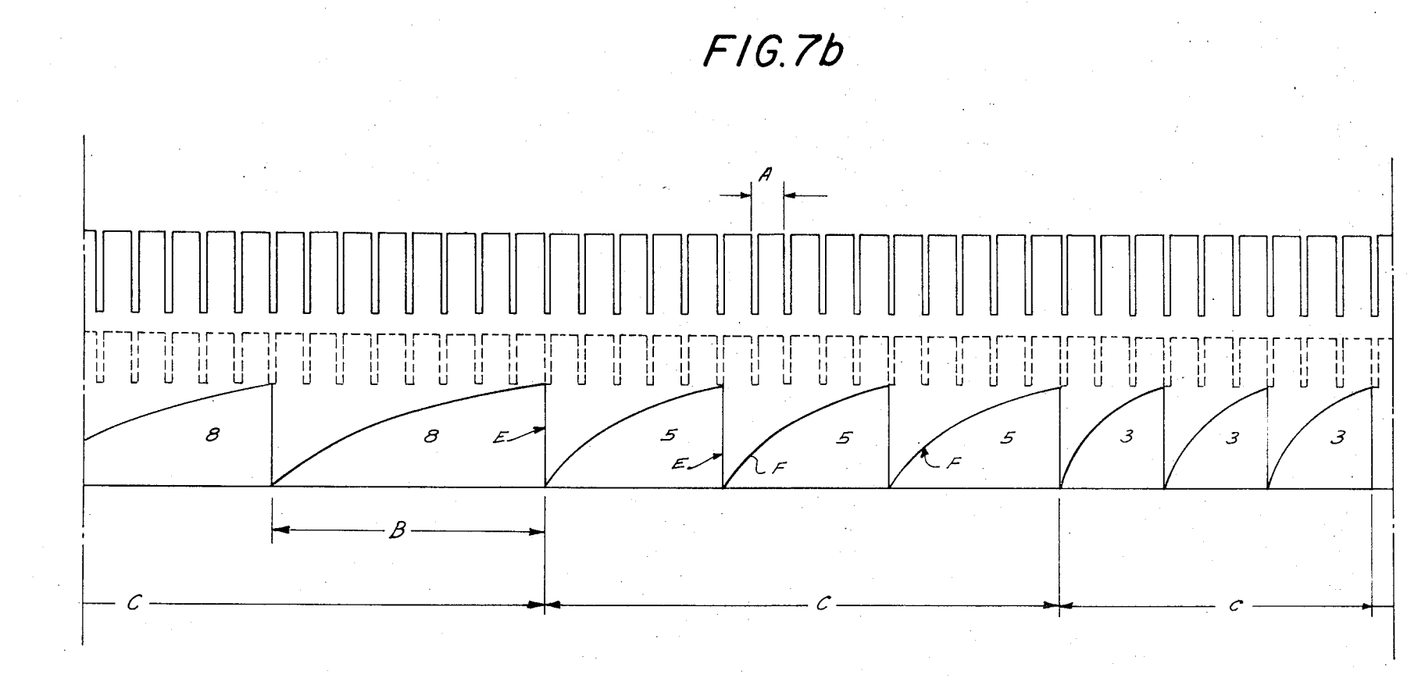

FIGS. 7a and 7b jointly illustrate graphically the theory of operation of the electronic system of the projector. As illustrated, the ordinates of the graph plots voltage and time of the system. The upper part of the graph, extending from 10 volts to 15 volts depicts the successive frame periods, A representing one period per film frame. The frame period may be varied in terms of time by means of a rheostat motor control (not shown). Different rheostat operated shutter shaft rotational speeds are represented by the arrows D. It will be understood that any number of speeds may be used by adjustment of the rheostat. Two different speeds only are indicated for simplicity.

B represents the time elapsed for the voltage from the timing circuitry to reach a 6 volt level. The time is controlled by the variable resistance of the potentiometer 72; the less the resistance the faster the time rise. The resistor is in series with the resistor 80; their sum in combination with capacitor 81 controls the rise time.

It can be seen from FIGS. 7a and 7b that relatively short electrical pulses are creatable at every closure of the commutator or shutter shaft switch. The magnitude of the pulses, as shown, is substantially one-third of the full voltage (15 volts), and is also negative-going in direction. The firing voltage of unijunction transistor 79 is approximately 60 percent (Eta) of the voltage (15 volts), applied to Base 2 thereof or 9 volts DC as indicated in the graph. Upon each and every negative pulse, the Base (B2) voltage is lowered by one-third; and the firing point of the unijunction is also lowered by one-third to the indicated value of 6 volts DC.

Voltages from the timing circuit of the electronic system to the emitter of the unijunction transistor as it rises to the 9 volt level is shown in the lowermost portion of the graph indicated by the rising curves F, F. B represents the periodicity of the rise time for different settings of the resistance of the potentiometer 72. Several rise time conditions are shown, each different condition being illustrated by the applied numerals 7, 8, 5 etc. "C" refers to time, and every time interval can have any number of discharge pulses E,E depending on how long the resistance of the potentiometer is allowed to remain in a fixed position. The drawing illustrates three and two discharge pulses for every time "C."

The voltage applied to Base 2 of the unijunction transistor is reduced at the rate of once per revolution of the shutter (cam) shaft. This event occurs only once per revolution irrespective of the shutter shaft speed. A change of shutter shaft speed results in a change of rate in terms of time of these events. The rate of pulsing due to the timing elements of the circuitry is unaffected by a change in shutter speed. The single frame advance occurs only after the voltage from the timing circuit to the emitter of the unijunction transistor is equal to or exceeds the 6 volt level. When this condition of coincidence occurs, a discharge E pulse is fed to the Power Pulsar which in turn momentarily activates the solenoid 37.

The operation of the projector for producing the different "sequences" of picture projection thereof can thus be explained by reference to the graph of FIGS. 7a and 7b, viewing the same from left to right. In a selected position of the resistances of the potentiomer 72, held in that position for a given time, three successive discharge pulses E are produced in the first C space, each effective for actuating the solenoid 37 momentarily; and the result is that a very low projection speed "sequence" is obtained in which the projected films are spaced seven frames apart. In the succeeding C space, a different held magnitude of the potentiometer resistance produces two discharge pulses E, with the result of further reducing the "sequence" projection speed, in which the projected films are spaced eight frames apart. In the third C space, with a held change in the magnitude of said resistance, three discharge pulses E are produced, thereby increasing the projection "sequence" speed in which the projected films are spaced five frames apart. In the succeeding C spaces, the speed of the motor has been reduced, and at its reduced speed, the potentiometer resistance has been changed, and held at each change, to produce the three different "sequences" of projection in which the projected films are spaced respectively, eight, five and three frames apart.

The overall operation of the motion picture projector combination may be described by reference to FIGS. 1, 4, 5, 6 and 7a.

A. Having reference first to FIG. 1, the projector includes a film transport means 10, operating means comprising cams 20 and 7 therefor, and a shutter 6 operable in a fixed cyclic movement relation to the film transport means, the film transport means being operable by its operating means at a normal rate of operation such as to produce continuous motion picture projection, and mechanism operative for controlling the operation of the film transport means for selectively changing the rate of operation of the film transport means, without altering said fixed cyclic relation, from its normal rate of producing a continuous projection of an operated film to a "sequence" projection, namely a slow series of automatically changing projections.

B. The said mechanism includes an operated device, namely a solenoid 37 and its armature actuated shoe 41 connected to a controlled electric circuit deriving its source from a 6 volt connection of the transformer 74 (FIG. 6) for energizing said solenoid to elevate its armature shoe to a set non-intercepting position (FIG. 1) to permit an uninterrupted operation of the film transport means, for producing the normal rate of picture projection.

C. The said mechanism comprises an electronic circuit system generally designated as 73 for operating the solenoid 37 to selectively change its operation and its rate of operation and therefore of the film transport means without altering its fixed cyclic relation relative to the shutter 6, from its aforesaid normal rate of producing continuous film projection to a "sequence" projection. The electronic circuit system includes a device, namely a potentiometer 72 for varying by stepless, i.e., continuous, increments the time intervals between the still projections of a "sequence" projection. More specifically, the electronic circuit system 73 is selectively operable for actuating the solenoid device 37 to control its rate of operation, i.e., its rate of interception and releasing by the solenoid shoe 41 of the film transport means 10 for producing the sequence of still projections.

Thus the solenoid device 37 which is connected to the electronic circuit system 73 (FIG. 6), when energized and de-energized by the electronic circuit system is actuatable between set (the up) and reset (the down) positions respectively to produce successive uninterrupted and interrupted operations respectively of the film transport means.

D. The projector further includes a switch means, namely switching elements 51, 52 and 53 (FIGS. 4 and 5), operably connected in fixed cyclic movement to the operating means of said film transport means, said switch being connected in circuit to the electronic circuit system 72 by way of the leads 57, 58. The said switch means provides a contact (with the pin 51) acting as a momentary contact in each of its cyclic movements such as to permit single frame advances (A) in the sequence film projections as portrayed in FIG. 7a.

E. The electronic circuit system 73 comprises electronic elements depicted in FIG. 6 for operating the unijunction transistor 83 for creating electrical pulses F, E (FIG. 7a) active on said solenoid device 37 to operate it for producing the film projection sequence or sequences. Thus the electronic circuit system includes means, namely the circuit of potentiometer 72 for varying by stepless, i.e., continuous, increments the creating of short electrical pulses operating on the solenoid 37 to vary the rate of intercepting and releasing of the film transport means 10.

F. The combination of the motion picture projector elements and the electronic circuit system provides the following structural and electrical components:

a. A switch which provides a contact acting as a momentary contact in each of its cyclic movements such as to permit single frame advances (A) in the sequence film projections;

b. Means, namely the unijunction transistor and its connections for creating pulses active on the solenoid device 37, this last recited means including means for producing a rise phase F, F, (FIG. 7a) in said pulses to charge points to energize said solenoid device and for producing drop phases (E, E) of said pulses to discharge points to de-energized the said solenoid device, effecting the releasing action and the intercepting action, respectively, of the film transport means 10; and c. Means, namely the circuit of the potentiometer 72 for varying the times of the rise phases of said pulses and for producing the drop phases of said pulses, the momentary contact switch (51, 52, 53) determining the times of the drop phases of said pulses.

It will be apparent that many changes may be made in the structure and relations of the disclosed features and parts of the motion picture projector of the invention without departing from the spirit of the invention as defined in the following claims.

We claim:

1. A motion picture projector including a film transport means, the film transport means being operable at a normal rate of operation such as to produce continuous motion picture projection, and mechanism for selectively changing the rate of operation of said film transport means from the normal rate of continuous projection to a "sequence" projection, namely a slow series of automatically changing still projections, said mechanism comprising an electrically operable device operative for intercepting and releasing said film transport means to prevent and permit respectively its engagement with the film, an electronic circuit system connected to said device selectively operable for actuating said device to control its rate of interception and releasing of the film transport means and for producing a pulse "sequence" projection, the electronic circuit system including a means for varying by stepless, i.e., continuous increments, the time intervals between the still projections produced in said pulse sequence projection, and a switch mechanically connected in cyclic timed relation to the operation of said film transport means, said switch being connected in circuit to the electronic circuit system and cooperating therewith to provide a momentary contact in each of its cyclic movements for controlling the pulse mode operation of said device in producing the sequence projection.

2. The motion picture projector of claim 1, in which the electronic circuit system includes means for creating electrical pulses active on said device, said last recited means including means for producing a rise phase in said pulses to charge points to energize said device and for producing a drop phase of said pulses to discharge points to de-energize said device, de-energization and energization of said device effecting the intercepting and releasing action of the film transport means.

3. The motion picture projector of claim 2, in which the electronic circuit system further includes means for varying the times of the rise phases of said pulses.

4. The motion picture projector of claim 3, in which the momentary contact switch mechanically connected to operate in timed relation to the operation of the film transport means is connected electrically to said electronic circuit system for determining the times of the drop phases of said pulses.

5. The motion picture projector of claim 1, in which an electric circuit is provided connected to said device for energizing said device for an indeterminate period to a condition to permit uninterrupted normal operation of the film transport means.

6. The motion picture projector of claim 1, in which the electronic circuit system includes means for creating short electrical pulses active on said device to operate it rapidly for producing its film transport means intercepting and releasing conditions, and the said switch provides its momentary contacts for controlling the pulse mode operation of said device.

7. The motion picture projector of claim 1, in which said switch is operably connected in fixed cyclic movement to the operation of said film transport means.

8. The motion picture projector of claim 1, in which said device when circuit de-energized is movable to a re-set position for intercepting the film transport means to effect interrupted operations of the film transport means.

9. The motion picture projector of claim 1, in which said device comprises a solenoid and its armature, the armature being an element movable with reference to the film transport means to effect the film transport intercepting and releasing actions.

10. The motion picture projector of claim 1, which includes a shutter operable in a fixed cyclic movement relation to the film transport means, and in which said switch includes a commutator fixed to the shaft of the shutter.

* * * * *